Oct. 29, 1963
P. BAUER
3,108,527
CONTROL DEVICES FOR CAMERAS
Filed Oct. 1, 1959
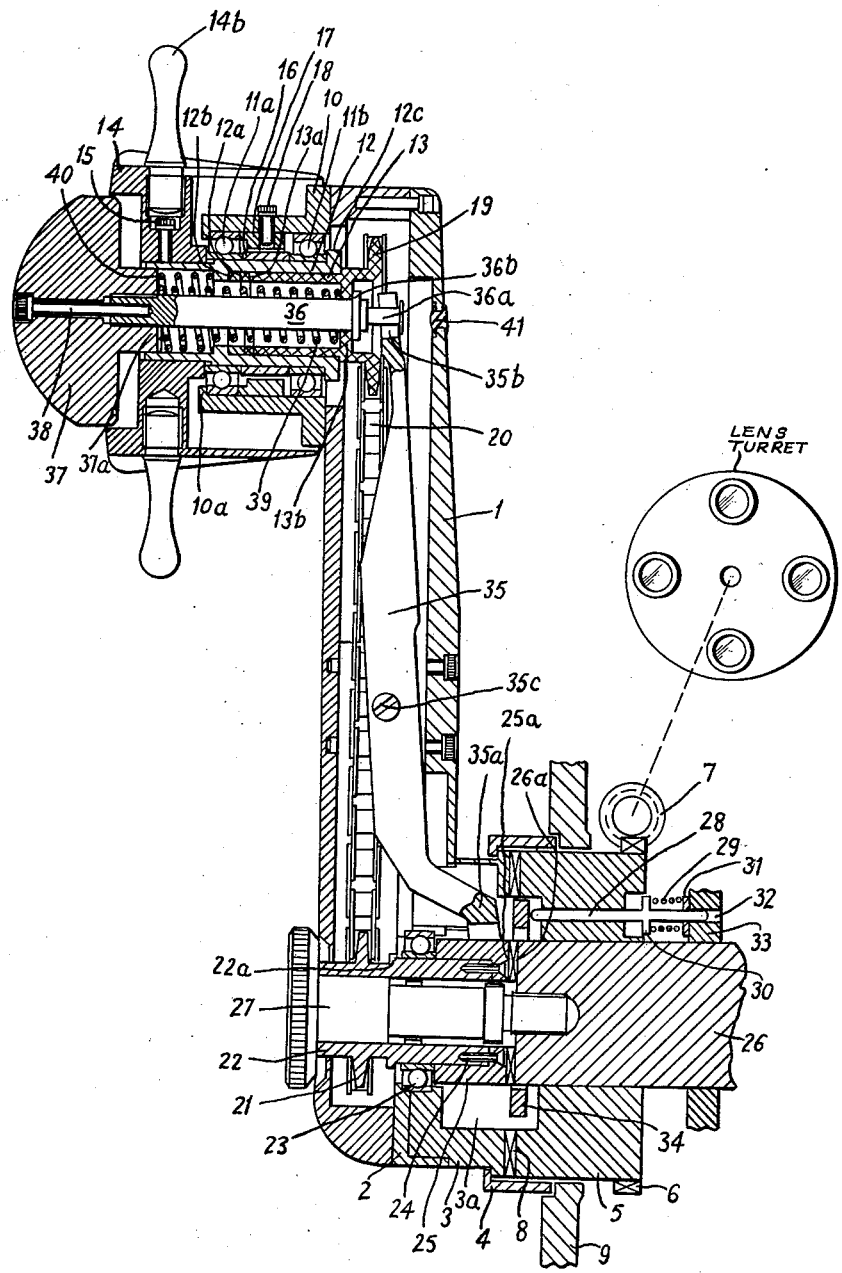
Inventor
*Peter Bauer*
By
*Attorneys*

United States Patent Office 3,108,527
Patented Oct. 29, 1963

3,108,527
CONTROL DEVICES FOR CAMERAS
Peter Bauer, Cambridge, England, assignor to Pye Limited, Cambridge, England, a company of Great Britain
Filed Oct. 1, 1959, Ser. No. 843,849
Claims priority, application Great Britain Oct. 22, 1958
12 Claims. (Cl. 95—45)

The present invention relates to control devices for cameras, and in particular to devices for operating the various controls of television cameras.

When television cameras are in use it is often necessary to operate several controls rapidly and in close succession. For example with a television camera provided with a lens turret, which is rotatable to bring one of a number of different lenses mounted thereon into an operative position, it is necessary for the lens turret to be rotated, and for the lens brought into operative position to be focused as quickly as possible. Previously the turret has been rotated by a crank or similar device such as a hand wheel which the camera operator rotates and a separate knob or handle has been provided for focusing the lenses. The operator has therefore, after rotation of the crank, to transfer his hand to the focus control knob in order to effect the focusing of the operative lens.

Alternatively, when the camera is provided with a zoom lens in place of the lens turret it is necessary for the zooming mechanism to be actuated and also for the focusing of the zoom lens to be effected by separate controls.

It is an object of the present invention to provide a control device by means of which the camera operator can simply and rapidly operate several camera controls, if necessary simultaneously.

According to the present invention a control device for a camera comprises a crank arm rotatable manually by a knob which is spaced from the axis of rotation of the crank arm and is rotatably mounted on the crank arm, the rotation of the crank arm actuating one camera control and the rotation of the knob actuating a second camera control.

The term "crank arm" used throughout the specification and in the appended claims includes within its scope a hand wheel or disc or a segment thereof which, with the axis of rotation thereof defines a crank arm.

The knob and its associated camera control are preferably so arranged that, during rotation of the crank arm by grasping the knob, the resultant rotation of the knob effects no variation of its associated camera control.

In order that the invention may be more readily understood, one embodiment thereof will now be described with reference to the accompanying drawing, which shows a section through a control device according to the invention for operating the focus control and for rotating the lens turret of a television camera.

Referring to the drawing, the control device comprises a hollow crank arm 1 provided at one end with a back plate 2, and a crank arm coupling bush 3 which is detachably secured by a threaded union nut 4 to a bush 5. The bush 5 carries a pinion 6 which meshes with a drive shaft indicated diagrammatically at 7, by which the lens turret may be rotated. The bush 5 is mounted in bearings in an aperture in the camera body 9, and supports the crank arm 1 so that it is free to turn relative to the camera body 9, and the bush 5 as well as the crank arm coupling bush 3 are formed on their adjacent transverse faces with axially extending interengaging teeth 8 which prevent relative rotation between the two bushes when the crank arm 1 is rotated.

At the end of the crank arm 1 remote from the crank arm coupling bush 3 is secured a mounting bush 10 having a bore therein extending parallel to the axis of rotation of the crank arm 1. Rotatably mounted within the mounting bush 10, in a pair of ball races 11a, 11b, are a pair of shafts 12, 13, the inner shaft 13 being telescopically slidable within the outer shaft 12 to engage or disengage axially extending teeth 13a provided on the shaft 13 and teeth 12a formed on a flange 12b within the outer shaft 12. The portion of the outer shaft 12 extending from the mounting bush 10 is reduced in diameter, and a knob 14 is locked thereto by a set screw 15 disposed beneath one of a number of handles 14b. In order to prevent axial movement of the knob 14 relative to the mounting bush 10, the inner rings of the bearing 11a, 11b, are located between the knob 14 and a flange 12c on the outer shaft 12 and are spaced apart by a spacer ring 16. The outer ring of the bearing 11a is additionally located between an inwardly extending lip 10a on the mounting bush 10 and a stepped ring 17 secured by a screw 18 within the mounting bush 10.

At the end of the inner shaft 13 remote from the knob 14 is a sprocket 19 which, by means of a roller chain 20 is coupled to a sprocket 21. The sprocket 21 is integral with a spindle 22 mounted for rotation, in bearings 23, coaxially within bush 3. Secured to the end of the spindle 22 remote from the sprocket 21 by screws 24, is a collar 25 which, together with a flange 22a on the spindle 22, spaced a short distance from the bearing 23 serves to locate the bearing 23 in position. The collar 25 is provided with axially extending teeth 25a at the end thereof remote from the bearing 23 which engage with corresponding axially extending teeth 26a provided on the adjacent surface of a spindle 26 rotatably mounted within the bush 5 in the camera body 9, which is connected to drive the mechanism (not shown) for altering the focus of the lens in the operative position.

The diameters of the sprockets 19 and 21 are the same, so that the ratio of the rotation of the spindles 22 and 26 relating to the knob 14 is 1:1.

The interengaging teeth 25a, 26a are held in engagement by means of a screw 27 which passes freely through the spindle 22 and is screwed into the other spindle 26. With this construction it will be seen that rotation of the knob 14, when the teeth 12a, 13a on the inner and outer shafts 12, 13 are in engagement will be transmitted to the spindle 26 and thereby effect focussing of the lens in the operative position.

Angular adjustment between the crank arm 1 and the bush 5 is effected by unscrewing the screw 27 and the union nut 4, thereby disengaging the teeth 3a, 5a and also the teeth 22a and 26a, then re-engaging the teeth in a new position and tightening the screw 27 and nut 4.

The device is additionally provided with a turret lock by means of which the lens turret may be positively indexed and retained in any one of its operative positions. This lock is mounted on one end of a rod 28 slidable into the bush 5, and is urged by a compression spring 29, which engages a collar 30 fixed to the rod 28, and also a washer 31 slidable on the rod 28, into an unlocked position in which the lock is withdrawn from apertures 32 in a plate 33 fixed relative to the camera body 9. This plate 33 is provided with a number of similar apertures at different angular positions each corresponding to an operative position of the lens turret. The end of the rod 28 remote from the lock is engaged by a thrust ring 34 coaxially mounted within an annular recess 39 in the crank arm coupling bush 3. Bearing on the other side of the ring 34 from the rod 28 is a U-shaped yoke 35a formed on one end of a lever 35 pivoted at 35c which at its other end is provided with a second U-shaped yoke 35b which engages a recessed portion 36a formed at one end of a rod 36 slidably mounted within the shafts 12 and 13. The rod 36 is mounted at its end adjacent the recessed portion 36a within a flange 13b integral with the inner shaft 13 and at its other end is secured to a boss portion 37a of a plunger 37 by a screw 38, the boss portion 37a being slidable within the outer shaft 12.

Surrounding the rod 36 are two compression springs 39, 40, the spring 39 engaging the plunger boss portion 37a and the flange 13b of the inner shaft 13 thereby serving to urge the plunger 37 and the inner shaft 13 apart by a distance which is limited by the collar 36b integral with the rod 36 which engages the flange 13b. The spring 40 engages the plunger boss portion 37a and the flange 12b of the outer shaft 12 thereby serving to urge the inner and outer shafts 12, 13 together to hold the axially extending teeth 12a, 13a thereof in engagement. The combined force exerted by the two springs 39, 40 is greater than the force exerted by the spring 29 of the turret lock so that the spring 29 is normally held compressed and the rod 28 is held in the locked position until the plunger 37 is depressed.

When the plunger 37 is depressed, the pivoted lever 35, under the pressure of spring 29 of the turret lock, is urged to a position in which the lock is disengaged and the crank arm 1 may be rotated to rotate the lens turret. The sliding movement of the plunger 37 and rod 36 is limited by a stop in the form of a rubber grommet 41 inserted in an aperture in the crank arm 1, which is engaged by the recessed end of the rod 36.

The depression of the plunger 37 also serves to disengage the drive to the focus control of the lens since the inner shaft 13 and collar 36b are held in engagement by the spring 39 and the inner shaft therefore moves with the rod 36 to a position in which the teeth 13a on the inner shaft 13 disengage from the teeth 12a on the outer shaft 12. Thus when the crank arm is rotated upon depression of the plunger 37 by an operator grasping the knob 14, the movement of the knob 14 does not alter the focus control until the lens turret is indexed in a new position.

The control device according to the present invention has the advantage that it is possible for the camera operator to rotate the lens turret by turning the crank arm and to focus the operative lens by rotating the knob without removing his hand from the knob, and without the focus settings of the lenses being disturbed whilst the turret is being rotated.

It will be understood that various modifications may be made without departing from the scope of the present invention. For example the inner shaft 13 may be omitted and the sprocket 19 may be formed directly on the end of the outer shaft 12. Thus the disengageable coupling between the two shafts 12 and 13 is eliminated. With this construction the diameters of the sprockets 19 and 21 are preferably the same, whereby the ratio of the gearing between the shaft 12 and the spindles 22 and 26 is 1:1, so that the spindles 22, 26 will not be turned during rotation of the crank arm 1, while the camera operator is grasping the knob 14.

Moreover, the crank arm may, instead of effecting rotation of the lens turret, be arranged to operate the zooming mechanism of a zoom lens, whilst the knob may be employed to effect the focussing of the zoom lens. Conversely the crank arm may be used to focus the zoom lens whilst the knob may be used to operate the zooming mechanism. For such applications the plunger 37, pivoted lever 35 and locking device 27 are preferably omitted.

Alternatively the knob may be used to control the iris diaphragm of the lens instead of the focussing thereof.

Furthermore, the control device may also be used for the remote control of cameras, in which case a servo-system may be inserted between the crank arm and knob and the lens and turret control mechanism.

Moreover the knob may be coupled to the spindle by intermeshing gears instead of by a chain drive. In such a modification the two sprockets are replaced by gears which are coupled together through an idler gear rotatable about a spindle secured to the crank arm. Alternatively the knob may be coupled to the spindle through more than one idler gear, or by a cable or belt.

When the knob is coupled to the spindle by a cable or belt, or by a chain as specifically described, means may be provided to maintain these tight in order to reduce backlash between the knob 14 and the spindles 22, 26.

I claim:

1. In a camera, a control device enabling the control of two separate camera controls by one hand, comprising a crank arm rotatable relative to the camera body about an axis of rotation, a knob for the manual rotation of said crank arm rotatably mounted on said crank arm at a position spaced from the axis of rotation of said crank arm, a lens turret carrying a plurality of lenses, means coupling said crank arm to said lens turret whereby rotation of said crank arm rotates said lens turret in order to bring one of said lenses selectively into an operative position in which the optical axis of that lens and the camera are in alignment, a focus control for said lens in the operative position of the camera and means coupling said knob to said focus control whereby rotation of said knob actuates said focus control.

2. In a camera, a control device enabling the control of two separate camera controls by one hand, comprising a crank arm rotatable relative to the camera body about an axis of rotation, a knob for the manual rotation of said crank arm rotatably mounted on said crank arm at a position spaced from the axis of rotation of said crank arm, a crank arm lock device, a plunger mounted in said knob and means coupling said plunger to said crank arm lock, whereby rotation of said crank arm is prevented until said plunger is depressed relative to said knob, a lens turret carrying a plurality of lenses, means coupling said crank arm to said lens turret whereby rotation of said crank arm rotates said lens turret in order to bring one of said lenses selectively into an operative position in which the optical axis of that lens and the camera are in alignment, a focus control for said lens in the operative position of the camera and means coupling said knob to said focus control whereby rotation of said knob actuates said focus control.

3. In a camera, a control device enabling the control of two separate camera controls by one hand, said control device comprising a first part in the form of a crank arm rotatable relative to the camera body about an axis of rotation and a second part in the form of a knob for the manual rotation of said crank arm rotatably mounted on said crank arm at a position spaced from the axis of rotation of said crank arm, a lens arrangement for said camera, said lens arrangement having an alterable focal length, means coupling one of the parts of said control device to said lens arrangement whereby rotation of said one part alters the focal length of said lens arrangement, a focus control for said lens arrangement and means for coupling the other of said parts of said control device to said focus control whereby rotation of said other part actuates said focus control.

4. A device according to claim 3, including a crank arm lock mounted in said crank arm, a plunger mounted in said knob, and means for coupling said plunger to said crank arm lock, whereby rotation of said crank arm is prevented until said plunger is depressed relative to said knob.

5. Device according to claim 4, wherein said coupling means comprises a lever, one end of said lever being in operative contact with said plunger, the other end of said lever operatively co-operating with said lock device and means for pivotally connecting said lever at a point intermediate its ends to the said crank arm.

6. Device according to claim 5, wherein depression of said plunger also disengages said coupling means between said knob and said focus control.

7. In a camera, a control device enabling the control of two separate camera controls by one hand, said control device comprising a first part in the form of a crank arm rotatable relative to the camera body about an axis of rotation and a second part in the form of a knob for the manual rotation of said crank arm rotatably mounted on said crank arm at a position spaced from the axis of rotation of said crank arm, a lens arrangement for said camera, said lens arrangement having an alterable focal length, means including a 1:1 ratio drive for coupling one of said parts of said control device to said lens arrangement whereby rotation of said one part alters the focal length of said lens arrangement, a focus control for said lens arrangement and means including a 1:1 ratio drive for coupling the other of said parts of said control device to said focus control whereby rotation of said other part actuates said focus control.

8. A device according to claim 7, including a spindle coaxially positioned with respect to the axis of rotation of said crank arm and means for coupling said spindle to said knob in the ratio of 1:1.

9. In a camera, a control device enabling the control of two separate camera controls by one hand, comprising a crank arm rotatable relative to the camera body about an axis of rotation, a knob for the manual rotation of said crank arm which is secured to an outer shaft rotatably mounted on said crank arm at a position spaced from the axis of rotation of said crank arm, a lens arrangement for said camera, means including a 1:1 ratio drive for coupling said crank arm to said lens arrangement whereby rotation of said crank arm adjusts said lens arrangement relative to the camera body, a focus control for said lens arrangement, means including said 1:1 ratio drive for coupling said knob to said focus control whereby rotation of said knob actuates said focus control, a plunger slidably mounted within said knob, an inner shaft coupled to said focus control and telescopically slidable within said outer shaft to engage or disengage a disengageable coupling between said outer shaft and said inner shaft and means for moving said inner shaft to disengage said coupling upon depression of said plunger.

10. A device according to claim 9, including a rod secured to said plunger and slidably mounted within said inner and outer shafts, first spring means acting between said plunger and said inner shaft to urge said inner shaft away from said plunger, and second spring means acting between said plunger and said outer shaft to urge said outer shaft to a position in which said disengageable coupling is engaged.

11. In a camera, a control device enabling the control of two separate camera controls by one hand, said control device comprising a first part in the form of a crank arm rotatable relative to the camera body about an axis of rotation and a second part in the form of a knob for the manual rotation of said crank arm, said knob being mounted for rotation on said crank arm about an axis parallel to the axis of rotation of the crank arm but at a position spaced from the axis of rotation of said crank arm, a lens system having two adjustable members, means coupling one of said parts of said control device to one of the adjustable members of said lens system whereby rotation of said one part adjusts the one member of said lens system, and means for coupling the other of said parts of said control device to the other adjustable member of said lens system, whereby rotation of said other part adjusts said other member of said lens system.

12. In a camera, a control device enabling the control of two separate camera controls by one hand, said control device comprising a first part in the form of a crank arm rotatable relative to the camera body about an axis of rotation and a second part in the form of a knob for the manual rotation of said crank arm, said knob being mounted for rotation on said crank arm about an axis parallel to the axis of rotation of the crank arm but at a position spaced from the axis of rotation of said crank arm, a lens system having two adjustable members, means including a 1:1 ratio drive coupling one of said parts of said control device to one of the adjustable members of said lens system whereby rotation of said one part adjusts the one member of said lens system and means including a 1:1 ratio drive for coupling the other of said parts of said control drive to the other adjustable member of said lens system, whereby rotation of said other part adjusts said other member of said lens system.

References Cited in the file of this patent
UNITED STATES PATENTS

| | | |
|---|---|---|
| 2,259,415 | Eddy | Oct. 14, 1941 |
| 2,511,646 | Marmour | June 13, 1950 |
| 2,632,370 | Shepard | Mar. 24, 1953 |
| 2,988,974 | Clifford | June 20, 1961 |